United States Patent
Oprea et al.

(10) Patent No.: US 9,838,407 B1
(45) Date of Patent: Dec. 5, 2017

(54) DETECTION OF MALICIOUS WEB ACTIVITY IN ENTERPRISE COMPUTER NETWORKS

(71) Applicant: EMC Corporation, Hopkinton, MA (US)

(72) Inventors: Alina M. Oprea, Arlington, MA (US); Zhou Li, Malden, MA (US); Robin Norris, Nashua, NH (US); Kevin D. Bowers, Melrose, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 115 days.

(21) Appl. No.: 15/085,551

(22) Filed: Mar. 30, 2016

(51) Int. Cl.
*H04L 29/06* (2006.01)

(52) U.S. Cl.
CPC ...... *H04L 63/1416* (2013.01); *H04L 63/1425* (2013.01)

(58) Field of Classification Search
None
See application file for complete search history.

(56) References Cited

U.S. PATENT DOCUMENTS

| | | | |
|---|---|---|---|
| 8,117,640 B1 | 2/2012 | Moriconi et al. | |
| 8,555,388 B1 * | 10/2013 | Wang | H04L 63/1416 709/245 |
| 8,849,921 B2 * | 9/2014 | Morss | H04L 12/585 707/754 |
| 9,143,522 B2 * | 9/2015 | Wang | H04L 63/1416 |
| 9,419,986 B2 * | 8/2016 | Hart | H04L 63/14 |
| 2008/0010225 A1 | 1/2008 | Gonsalves et al. | |
| 2008/0162592 A1 | 7/2008 | Huang et al. | |
| 2016/0366159 A1 * | 12/2016 | Chiba | G06F 21/55 |
| 2017/0013018 A1 * | 1/2017 | Nakata | H04L 12/6418 |

OTHER PUBLICATIONS maxmind.com, "IP Geolocation and Online Fraud Prevention," http://www.maxmind.com/, Jan. 21, 2016, 1 page.
virustotal.com, "Free Online Virus, Malware and URL Scanner," http://www.virustotal.com/, Jan. 21, 2016, 1 page.

(Continued)

*Primary Examiner* — Christopher Revak
(74) *Attorney, Agent, or Firm* — Ryan, Mason & Lewis, LLP

(57) ABSTRACT

A processing device in one embodiment comprises a processor coupled to a memory and is configured to obtain internal log data of a computer network of an enterprise, to extract values of a plurality of designated internal features from the log data, to obtain additional data from one or more external data sources, and to extract values of a plurality of designated external features from the additional data. The extracted values are applied to a regression model based on the internal and external features to generate malicious activity risk scores for respective ones of a plurality of domains, illustratively external domains having fully-qualified domain names (FQDNs). A subset of the domains are identified based on their respective malicious activity risk scores, and one or more proactive security measures are taken against the identified subset of domains. The processing device may be implemented in the computer network or an associated network security system.

20 Claims, 6 Drawing Sheets

(56) References Cited

OTHER PUBLICATIONS

Nicole Perlroth, "Hackers in China Attacked the Times for Last 4 Months," http://www.nytimes.com/2013/01/31/technology/chinese-hackers-infiltrate-new-york-times-computers.html, Jan. 30, 2013, 9 pages.
securityweek.com, "Information Security News, IT Security News & Expert Insights: Security Week," http://www.securityweek.com/targets-data-breach-comercialization-apt, Jan. 21, 2016, 7 pages.
Verizon, "2015 Data Breach Investigations Report (DBIR)," available at: http://www.verizonenterprise.com/DBIR/2015/, 2015, 70 pages.
w3guy.com, "How to Spoof, Hide, or Remove HTTP Referer," http://w3guy.com/hidding-http-referer/, Apr. 3, 2014, 4 pages.
D.S. Anderson et al., "Spamscatter: Characterizing Internet Scam Hosting Infrastructure," 16th USENIX Security Symposium, Aug. 9, 2007, pp. 135-148.
M. Antonakakis et al., "Building a Dynamic Reputation System for DNS," 16th USENIX Security Symposium, Aug. 11, 2010, pp. 273-290, Article No. 10.
M. Antonakakis et al., "Detecting Malware Domains at the Upper DNS Hierarchy," 20th USENIX Conference on Security (SEC), Aug. 8, 2011, 16 pages.
M. Antonakakis et al., "From Throw-Away Traffic to Bots: Detecting the Rise of DGA-Based Malware," 21st USENIX Conference on Security Symposium, Aug. 8, 2012, pp. 491-506.
L. Bilge et al., "Disclosure: Detecting Botnet Command and Control Servers Through Large-Scale NetFlow Analysis," 28th Annual Computer Security Applications Conference (ACSAC), Dec. 3-7, 2012, pp. 129-138.
L. Bilge et al., "Exposure: Finding Malicious Domains Using Passive DNS Analysis," 18th Annual Network and Distributed Security Symposium (NDSS), Feb. 6-9, 2011, 17 pages.
Leo Breiman, "Random Forests," Machine Learning, Oct. 1, 2001, pp. 5-32, vol. 45, No. 1.
K.M. Carter et al., "Probabilistic Threat Propagation for Network Security," IEEE Transactions on Information Forensics and Security, Sep. 2014, pp. 1394-1405, vol. 9, No. 9.
S. Chhabra et al., "Phi.sh/$oCiaL: The Phishing Landscape through Short URLs," 8th Annual Collaboration, Electronic Messaging, Anti-Abuse and Spam Conference (CEAS), Sep. 1-2, 2011, pp. 92-101, Perth, Australia.
crossrider.com, "Crossrider—Monetising Desktop and Mobile Media Through the Use of Big Data" https://crossrider.com/, Jan. 22, 2016, 5 pages.
mirror1.malwaredomains.com, "DNS-BH: Malware Domain Blocklist," http://mirror1.malwaredomains.com/files/, Jan. 22, 2016, 6 pages.
M. Felegyhazi et al., "On the Potential of Proactive Domain Blacklisting," 3rd USENIX Workshop on Large-Scale Exploits and Emergent Threats (LEET), Apr. 27, 2010, 8 pages.
J. Friedman et al., "Regularization Paths for Generalized Linear Models via Coordinate Descent," Journal of Statistical Software, Aug. 30, 2010, pp. 1-22, vol. 33, No. 1.
C. Grier et al., "Manufacturing Compromise: The Emergence of Exploit-as-a-Service," ACM Conference on Computer and Communications Security (CCS), Oct. 16-18, 2012, pp. 821-832.
T. Halvorson et al., "From .academy to .zone: An Analysis of the New TLD Land Rush," ACM Conference on Internet Measurement Conference (IMC), Oct. 28-30, 2015, pp. 381-394, Tokyo, Japan.
T. Holz et al., "Measuring and Detecting Fast-Flux Service Networks," Network and Distributed System Security Symposium (NDSS), Feb. 10-13, 2008, 12 pages.
L. Invernizzi et al., "Nazca: Detecting Malware Distribution in Large-Scale Networks," 21st Annual Network and Distributed System Security Symposium (NDSS), Feb. 23-26, 2014, 16 pages.
blog.kotowicz.net, "Stripping Referrer for Fun and Profit: The World According to Koto," http://blog.kotowicz.net/2011/10/stripping-referrer-for-fun-and-profit.html, Oct. 24, 2011, 4 pages.
Z. Li et al., "Finding the Linchpins of the Dark Web: a Study on Topologically Dedicated Hosts on Malicious Web Infrastructures," IEEE Symposium on Security and Privacy (SP), May 19-22, 2013, pp. 112-126.
J. Liang et al., "When HTTPS Meets CDN: A Case of Authentication in Delegated Service," IEEE Symposium on Secruity and Privacy (SP), May 18-21, 2014, pp. 67-82.
J. Ma et al., "Beyond Blacklists: Learning to Detect Malicious Web Sites from Suspicious URLs," 15th ACM SIGKDD International Conference on Knowledge Discovery and Data Mining (KDD), Jun. 28-Jul. 1, 2009, pp. 1245-1254, Paris, France.
P.K. Manadhata et al., "Detecting Malicious Domains via Graph Inference," 19th European Symposium on Research in Computer Security (ESORICS), Lecture Notes in Computer Science, Sep. 7-11, 2014, pp. 1-18, Part 1, vol. 8712, Wroclaw, Poland.
mandiant.com, "MANDIANT: APT1: Exposing One of China's Cyber Espionage Units," www.mandiant.com, Feb. 18, 2013, 76 pages.
microsoft.com, "Microsoft Security Intelligence Report," http://www.microsoft.com/security/sir/default.aspx, Jul.-Dec. 2014, 146 pages, vol. 18.
T. Nelms et al., "ExecScent: Mining for New C&C Domains in Live Networks with Adaptive Control Protocol Templates," 22nd USENIX Security Symposium, Aug. 14-16, 2013, pp. 589-604.
A. Oprea et al., "Detection of Early-Stage Enterprise Infection by Mining Large-Scale Log Data," 45th Annual IEEE/IFIP International Conference on Dependable Systems and Networks (DSN), Jun. 22-26, 2015, pp. 45-56, Rio de Janeiro, Brazil.
optimizesmart.com, "Geek Guide to Removing Referrer Spam in Google Analytics," http://www.optimizesmart.com/geek-guide-removing-referrer-spam-google-analytics, Jan. 22, 2016, 15 pages.
pandasecurity.com, "Panda Security: PandaLabs Annual Report 2014," http://press.pandasecurity.com, 2014, 37 pages.
R. Perdisci et al., "Behavioral Clustering of HTTP-Based Malware and Signature Generation Using Malicious Network Traces," 7th USENIX Conference on Networked Systems Design and Implementation (NSDI), Apr. 2010, pp. 391-404.
B. Rahbarinia et al., "Segugio: Efficient Behavior-Based Tracking of Malware-Control Domains in Large ISP Networks," 45th Annual IEEE/IFIP International Conference on Dependable Systems and Networks (DSN), Jun. 22-25, 2015, pp. 403-414, Rio de Janeiro, Brazil.
M.A. Rajab et al., "CAMP: Content-Agnostic Malware Protection," 20th Annual Network and Distributed System Security Symposium (NDSS), Feb. 24, 2013, 15 pages.
R. Sommer et al., "Outside the Closed World: On Using Machine Learning for Network Intrusion Detection," IEEE Symposium on Security and Privacy (SP), May 16-19, 2010, pp. 305-316.
B. Stone-Gross et al., "FIRE: Finding Rogue Networks," IEEE Annual Computer Security Applications Conference (ACSAC), Dec. 7, 2009, pp. 231-240.
T.-F. Yen et al., "Beehive: Large-Scale Log Analysis for Detecting Suspicious Activity in Enterprise Networks," 29th Annual Computer Security Applications Conference (ACSAC), Dec. 9-13, 2013, pp. 199-208.
Google Inc., https://raw.githubusercontent.com/WPO-Foundation/webpagetest/master/agent/wpthook/cdn.h, Mar. 7, 2016, 4 pages.
"RSA enVision® Platform at a Glance," The Security Division of EMC, 3-in-1 Log Management Solution, Product Data Sheet 2008-2009, 2 pages.
U.S. Appl. No. 12/982,288 filed in the name of John P. Field et al. on Dec. 30, 2010 and entitled "Distributed Security Information and Event Management System with Application-Injected Remote Components."
U.S. Appl. No. 14/554,492 filed in the name of Alina M. Oprea et al. on Nov. 26, 2014 and entitled "Determining Risk of Malware Infection in Enterprise Hosts."
U.S. Appl. No. 14/674,905 filed in the name of Alina M. Oprea et al. on Mar. 31, 2015 and entitled "Detection of Suspicious Domains Through Graph Inference Algorithm Processing of Host-Domain Contacts."

\* cited by examiner

FIG. 3

| CATEGORY | ATTRIBUTE | FEATURES |
|---|---|---|
| COMMUNICATION | HOSTS | TOTAL NUMBER |
| | CONNECTIONS | TOTAL NUMBER<br>AVG/MAX/MIN NUMBER PER HOST |
| | BYTES SENT AND RECEIVED | TOTAL NUMBER<br>AVG/MAX/MIN RATIO PER HOST |
| | POST AND GET CONNECTIONS | TOTAL NUMBER<br>AVG/MAX/MIN RATIO PER HOST |
| DOMAIN | LENGTH | DOMAIN NAME LENGTH |
| | LEVELS | NUMBER OF LEVELS |
| | SUB-DOMAINS | NUMBER OF SUB-DOMAINS ON SLD |
| | TLD | TOP-LEVEL DOMAIN |
| URL | DISTINCT URLs | TOTAL NUMBER OF DISTINCT URLs |
| | PATH | AVG/MAX/MIN PATH LENGTH PER URL<br>AVG/MAX/MIN PATH DEPTH PER URL |
| | PARAMETERS | TOTAL NUMBER OF PARAMETERS<br>AVG/MAX/MIN NUMBER OF PARAMETERS PER URL<br>AVG/MAX/MIN NUMBER OF VALUES PER PARAMETER |
| | FILE | FRACTION OF URLs WITH FILE NAME/EXTENSION<br>TOTAL NUMBER OF FILE NAMES AND EXTENSIONS |
| | QUERY STRINGS | FRACTION OF URLs WITH QUERY STRING |
| | FRAGMENTS | FRACTION OF URLs WITH FRAGMENTS<br>TOTAL NUMBER OF FRAGMENTS |
| | DOMAIN URL | FRACTION OF DOMAIN URLs |
| UA | DISTINCT UAs | TOTAL NUMBER OF UAs<br>RATIO OF DISTINCT UAs OVER HOSTS<br>AVG/MAX/MIN NUMBER OF UAs PER HOST |
| | EMPTY UA | FRACTION OF CONNECTIONS WITHOUT UA |
| | UA POPULARITY | FRACTION OF UNPOPULAR UAs<br>INVERSE AVERAGE UA POPULARITY |
| | BROWSER | DOMINANT BROWSER<br>AVG NUMBER OF BROWSERS PER HOST |
| | OS | DOMINANT OS<br>AVG NUMBER OF OSs PER HOST |
| RESULT CODE | RESULT CODE | FRACTION OF CONNECTIONS WITH 2xx/3xx/4xx/5xx<br>NUMBER OF CONNECTIONS WITH 2xx/3xx/4xx/5xx<br>RATIO OF FAILING OVER SUCCESSFUL CONNECTIONS |
| REFERRER | EMPTY REFERRER | FRACTION OF CONNECTIONS WITHOUT REFERRER |
| | DOMAIN | NUMBER OF DISTINCT REFERRER DOMAINS<br>RATIO OF DISTINCT DOMAINS OVER HOSTS<br>AVG/MAX/MIN NUMBER OF DOMAINS PER HOST<br>HAS DOMAIN DIFFERENT THAN ITSELF |
| CONTENT-TYPE | CONTENT-TYPE | NUMBER OF DISTINCT CONTENT-TYPES<br>FRACTION OF CONTENT-TYPES IN EACH CATEGORY |

FIG. 4

| CATEGORY | ATTRIBUTE | FEATURES |
|---|---|---|
| WHOIS | AGE | REGISTRATION/UPDATE AGE |
| | VALIDITY | REGISTRATION/UPDATE VALIDITY |
| | EMAIL | REGISTRATION EMAIL CATEGORY |
| HOSTING TYPE | SUSPICIOUS SERVICES | FREE-HOSTING/DYNAMIC DNS/SHORTENERS |
| IP | ASN | ASNs OF RESOLVED DOMAIN IPs<br>NUMBER OF DISTINCT ASNs |
| | COUNTRY | COUNTRIES OF RESOLVED DOMAIN IPs<br>NUMBER OF DISTINCT COUNTRIES |

FIG. 5

| FEATURE | BINARY FEATURES | SELECTED FEATURES |
|---|---|---|
| TLD | 132 | 37 |
| ASN | 3272 | 207 |
| COUNTRY | 99 | 19 |
| OS | 15 | 11 |
| BROWSER | 9 | 4 |
| REGISTRATION EMAIL | 5 | 4 |
| TOTAL | 3532 | 282 |

FIG. 6

| TLD | WEIGHT | ASN | WEIGHT | COUNTRY | WEIGHT |
|---|---|---|---|---|---|
| pw | 6.69 | 59711 | 6.48 | SY | 4.93 |
| sy | 5.7 | 43808 | 6.48 | BZ | 3.26 |
| cc | 3.74 | 7511 | 6.08 | MD | 1.92 |
| om | 3.51 | 57043 | 6.08 | PT | 1.68 |
| ml | 3.24 | 50448 | 6.08 | NL | 1.18 |

DETECTION OF MALICIOUS WEB ACTIVITY IN ENTERPRISE COMPUTER NETWORKS

FIELD

The field relates generally to computer networks, and more particularly to techniques for providing security in a computer network.

BACKGROUND

Computer networks are often configured to incorporate network security systems in order to protect the networks against malicious activity. Such malicious activity can include, for example, deployment of malware that is utilized by attackers to create networks of compromised computers or "botnets."

Network security systems can be designed to protect a computer network of a large enterprise comprising many thousands of host devices, also referred to herein as simply "hosts." However, enterprise computer networks are in many cases continuously growing in size, and often incorporate a diverse array of host devices, including mobile telephones, laptop computers and tablet computers. This continuous growth can make it increasingly difficult to provide a desired level of protection using the limited resources of the network security system. For example, available network security system functionality such as processing of security alerts and deployment of attack remediation measures on host devices can be strained by the demands of large enterprise networks.

Moreover, recent years have seen the rise of increasingly sophisticated attacks including advanced persistent threats (APTs) which can pose severe risks to enterprises. These APTs are typically orchestrated by well-funded attackers using advanced tools to adapt to the victim environment while maintaining low profiles of activity. As a result, anti-virus software, firewalls, web proxies and other traditional security technologies typically deployed by enterprise network security systems today often fail at detecting and remediating malicious activity at a sufficiently early stage. To further complicate matters, the volume of alerts generated by these products quite often overwhelm the security staff who have no way of prioritizing or quickly weeding out false alarms.

Many enterprises are complementing the above-noted traditional defenses with manual analysis performed by incident response teams. For example, these enterprises may employ "hunters" to search for malicious activity that has evaded their automated security technologies. However, such arrangements are not scalable, both due to a lack of qualified people and the high rate at which malware is invading the enterprise.

Accordingly, there remains an unacceptably large gap between an attacker's "time-to-compromise" an enterprise computer network and a defender's "time-to-discover" the corresponding internal breach.

SUMMARY

Illustrative embodiments of the invention advantageously provide techniques for detection of malicious web activity that may adversely impact enterprise computer networks and other types of computer networks. For example, certain embodiments determine malicious activity risk scores for respective external domains using a regression model that is based on potentially large numbers of designated internal features of HTTP log data of an enterprise as well as designated external features from additional data sources external to the enterprise. Such a regression model is trained over the designated internal and external features using a combination of unknown domains and known malicious domains, and provides highly accurate results that have been confirmed using actual internal HTTP log data and external data.

Using malicious activity risk scores determined for respective external domains, a network security system can prioritize for attention those particular external domains that are most likely to be associated with malware. This allows the network security system to conserve its limited resources, while also providing a significant reduction in the above-noted gap between "time-to-compromise" and "time-to-discover."

In one embodiment, a processing device comprises a processor coupled to a memory and is configured to obtain internal log data of a computer network of an enterprise, to extract values of a plurality of designated internal features from the log data, to obtain additional data from one or more external data sources, and to extract values of a plurality of designated external features from the additional data. The extracted values are applied to a regression model based on the internal and external features to generate malicious activity risk scores for respective ones of a plurality of domains. The plurality of domains illustratively comprise respective ones of a plurality of external fully-qualified domain name (FQDN) domains contacted by host devices of the enterprise.

A subset of the domains are identified based on their respective malicious activity risk scores, and one or more proactive security measures are taken against the identified subset of domains. The malicious activity risk scores illustratively indicate likelihoods that the respective domains are associated with malware. For example, domains may be sources of malware. Additionally or alternatively, the domains may comprise malware-controlled domains. As a more particular example, a domain associated with malware may comprise a command-and-control ("C&C") domain that malware on an enterprise host communicates with in order to receive further instructions.

The designated internal features in some embodiments comprise one or more communication related features, one or more domain structure related features, one or more uniform resource locator (URL) related features, and one or more user agent (UA) related features.

The designated external features in some embodiments comprise one or more registration related features, one or more autonomous system related features, and one or more country related features.

Additional or alternative internal or external features can be used in other embodiments. For example, in some embodiments, the designated internal features further comprise one or more result code related features, one or more referrer related features, or one or more content type features. As another example, the designated external features illustratively further comprise one or more hosting type features.

A given processing device configured with functionality for detecting malicious activity in an enterprise computer network may be implemented, for example, in one or more network devices of the computer network, or in a security analytics system or other type of network security system implemented in or otherwise associated with the computer network.

Other embodiments include, without limitation, methods, apparatus, networks, systems and processor-readable storage media.

BRIEF DESCRIPTION OF THE DRAWINGS

FIG. 3 shows an example set of internal features at least a subset of which are utilized to generate a regression model for detecting malicious web activity in an illustrative embodiment.

FIG. 4 shows an example set of external features at least a subset of which are utilized to generate a regression model for detecting malicious web activity in an illustrative embodiment.

FIG. 5 shows an example subset of categorical features from the example sets of internal and external features of FIGS. 3 and 4.

FIG. 6 illustrates additional details associated with respective ones of the categorical features of FIG. 5.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
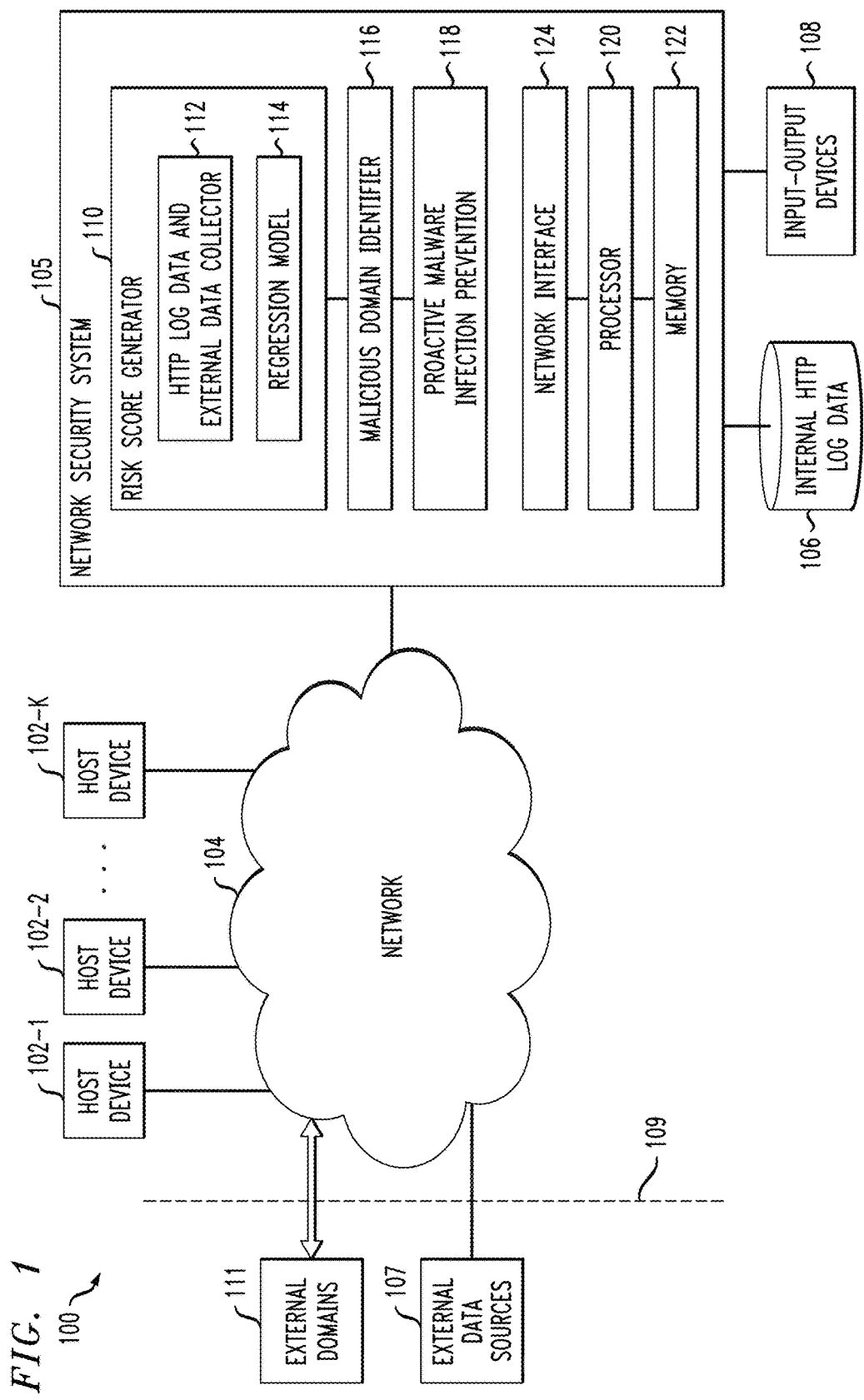
FIG. 1 shows a computer network comprising a network security system configured to detect malicious web activity utilizing a regression model based on a combination of internal and external features in an illustrative embodiment of the invention.

FIG. 1 shows a computer network 100 configured in accordance with an illustrative embodiment of the invention. The computer network 100 comprises a plurality of host devices 102-1, 102-2, . . . 102-K, collectively referred to herein as host devices 102. The host devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a network security system 105.

The host devices 102 may comprise, for example, mobile telephones, laptop computers, tablet computers, desktop computers or other types of devices, in any combination, capable of supporting users of the network 100. Such devices are examples of what are more generally referred to herein as "processing devices." Some of these processing devices are also generally referred to herein as "computers."

The host devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

The network security system 105 has an associated database 106 configured to store internal HTTP log data of the enterprise, as well as other types of information utilized in controlling access to protected resources and otherwise providing security within the computer network 100. Although illustrative embodiments utilize HTTP log data, such as HTTP headers from web proxy logs, additional or alternative log data can be used in other embodiments, including packet data.

The database 106 in the present embodiment is implemented using one or more storage systems associated with the network security system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation of Hopkinton, Mass. Combinations of multiple ones of these and other storage products can also be used in implementing a given storage system in an illustrative embodiment. In addition, one or more of the above-listed storage products can be used to implement an internal memory of the network security system 105.

Additional information stored in the database 106 illustratively comprises information obtained from external data sources 107. These external data sources are accessible to the network security system 105 via the network 104.

Also associated with the network security system 105 are input-output devices 108, which illustratively comprise keyboards, displays or other types of input-output devices in any combination. Such input-output devices are used to support one or more user interfaces to the network security system 105, as well as to support communication between the network security system 105 and other related systems and devices not explicitly shown.

The computer network 100 in the present embodiment is assumed to comprise at least one firewall 109. Internal HTTP log data stored in the database 106 illustratively comprises HTTP log data that is gathered from the enterprise side of the firewall 109, also referred to as "inside" or "within" the firewall 109 in this embodiment. The external data sources 107 are assumed to be on the other side of the firewall 109, and in some embodiments comprise publicly-accessible data sources such as a WHOIS service implemented outside of the enterprise.

The network security system 105 in this embodiment comprises a risk score generator 110. The risk score generator 110 is configured to facilitate the prevention of malware infection in the host devices 102 by determining malicious activity risk scores for respective external domains 111 that are outside of the enterprise firewall 109. This allows proactive security measures to be applied against particular identified ones of the external domains 111 that are most likely to be associated with malicious activity. For example, the malicious activity risk scores provided by the risk score generator 110 are illustratively utilized within the network security system 105 to identify particular ones of the external domains 111 that are most likely to be sources of potential malware infection for the host devices 102, or otherwise associated with malware, such that limited resources of the network security system 105 available for proactive prevention can be more intelligently and effectively deployed in the computer network 100. The external domains in this embodiment are assumed to have respective fully-qualified domain names (FQDNs), although other types of domains can be used in other embodiments. Also, it is assumed that the external domains 111 can each be contacted by one or more of the host devices 102 of the enterprise over the network 104.

It should be noted that the term "malware" as used herein is intended to be broadly construed, and should not be viewed as limited to malware that is spread or otherwise deployed through viruses each comprising one or more malicious files. Moreover, embodiments of the invention can be configured to detect additional or alternative types of malicious activity not necessarily related to malware infection.

The risk score generator 110 in this embodiment comprises a data collector 112 and a regression model 114, and is configured to interact with a malicious domain identifier 116 coupled to a proactive malware infection prevention module 118. It is to be appreciated that this particular arrangement of modules is presented by way of example only, and alternative arrangements can be used in other embodiments. For example, the functionality associated with the modules 112, 114, 116 and 118 in other embodiments can be combined into a single module, or separated across a larger number of modules.

The data collector 112 collects internal HTTP log data from the database 106 and also collects additional data from one or more of the external data sources 107.

The regression model 114 in this embodiment comprises a predictive model that assigns malicious activity risk scores to respective ones of a plurality of domains, illustratively respective ones of the external domains 111 that are outside of the enterprise firewall 109. The regression model 114 utilizes a combination of internal features of HTTP log data and external features from external data sources. As will be described in more detail below, these features include numeric values, categorical features, and other types of features. Some of the features are relatively static, while others tend to vary over time.

As indicated above, the network security system 105 in the present embodiment is configured to detect and prioritize domains associated with malicious activity in the computer network 100. Accordingly, the network security system 105 is advantageously configured to close the gap between "time-to-compromise" and "time-to-discover" in the computer network 100. For example, the network security system 105 is illustratively configured to analyze the HTTP log data collected within the enterprise in conjunction with additional data collected from external data sources and to predict with high accuracy new malicious activities that may be overlooked by traditional security technologies. Some embodiments are based at least in part on analysis of internal features relating to HTTP connections from enterprise web proxy logs as well as external features from publicly-available data sources. These embodiments implement regression models and associated machine learning functionality to detect those domains that are most likely to be associated with malicious activity.

The network security system 105 in the FIG. 1 embodiment is assumed to be implemented using at least one processing device. Each such processing device generally comprises at least one processor and an associated memory, and implements one or more functional modules for controlling certain features of the network security system 105.

More particularly, the network security system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals. Additional or alternative computer program products not necessarily comprising articles of manufacture are also considered embodiments of the present invention.

The network interface 124 allows the network security system 105 to communicate over the network 104 with the host devices 102, and illustratively comprises one or more conventional transceivers.

At least portions of the risk score generator 110, such as portions of one or more of data collector 112 and regression model 114, and additionally or alternatively at least portions of one or both of the malicious domain identifier 116 and the proactive malware infection prevention module 118, may be implemented at least in part in the form of software that is stored in memory 122 and executed by processor 120.

It is to be understood that the particular set of elements shown in FIG. 1 for determining risk of malicious activity for respective ones of the external domains 111 and proactively addressing that risk is presented by way of illustrative example only, and in other embodiments additional or alternative elements may be used. Thus, another embodiment may include additional or alternative systems, devices and other network entities, as well as different arrangements of modules and other components.

By way of example, in other embodiments, the network security system 105 can be eliminated and the risk score generator 110, malicious domain identifier 116 and proactive malware infection prevention module 118 can be implemented elsewhere in the computer network 100.

In some embodiments, the network security system 105 is a part of or otherwise associated with another system, such as, for example, a security operations center (SOC) or a critical incident response center (CIRC).

Additionally or alternatively, the network security system 105 can be part of or incorporate an otherwise conventional security analytics system, such as the RSA Security Analytics system commercially available from RSA, The Security Division of EMC Corporation of Hopkinton, Mass.

Other embodiments can implement the network security system 105 and its associated risk score generator 110 as part of or in conjunction with a security information and event management (SIEM), such as the enVision® platform, also commercially available from RSA. Additional details regarding SIEM systems can be found in, for example, U.S. patent application Ser. No. 12/982,288, filed Dec. 30, 2010 and entitled "Distributed Security Information and Event Management System with Application-Injected Remote Components," which is commonly assigned herewith and incorporated by reference herein.

In such embodiments, at least portions of the internal HTTP log data stored in the database 106 illustratively comprise security logs collected by the SIEM system.

An exemplary process utilizing risk score generator 110 in computer network 100 will now be described in more detail with reference to the flow diagram of FIG. 2. It is to be understood that this particular process is only an example, and additional or alternative processes can be carried out in other embodiments.

In this embodiment, the process includes steps 200 through 210. Steps 200, 202, 204 and 210 are assumed to be performed by the risk score generator 110 in conjunction with determination of risk of malicious activity for respective external domains 111. Steps 206 and 208 are examples of malicious domain identification and proactive prevention steps assumed to be performed by the malicious domain identifier 116 and proactive malware infection prevention module 118, respectively, of the network security system 105.

In step 200, internal log data of a computer network of an enterprise is obtained. Also, additional data is obtained from external data sources. As mentioned above, the computer network 100 is assumed to be associated with a particular company, organization or other enterprise, and is therefore also referred to herein as an "enterprise network." The internal log data obtained in step 200 illustratively comprises internal HTTP log data obtained from security logs of the enterprise as stored in the database 106. Such data may more particularly comprise HTTP header information collected by web proxies through which the host devices 102 access external web sites or other web-based resources. Other types of internal log data can be used in other embodiments. The term "internal log data" as used herein is therefore intended to be broadly construed. The additional data obtained in step 200 illustratively comprises data obtained from one or more of the external data sources 107. Examples of such external data sources include a WHOIS data source, a hosting type data source, and an IP geolocation data source.

The internal log data and the additional data are obtained in the present embodiment by the data collector 112 from the database 106 and the external data sources 107 accessible to the network security system 105. In other embodiments, at least portions of the data obtained in step 200 can be obtained in other ways, such as directly from one or more of the host devices 102 or from other system components.

In step 202, values of designated internal features are extracted from the internal log data and values of designated external features are extracted from the additional data. Examples of respective sets of internal and external features utilizable in illustrative embodiments are shown in FIGS. 3 and 4 and will be described in more detail below.

In step 204, the extracted values are applied to a regression model based on the internal and external features to generate malicious activity risk scores for respective domains. The regression model in this embodiment is assumed to be the regression model 114 which is configured based on the designated internal and external features. The extracted values generally correspond to respective ones of the internal and external features that are incorporated by the regression model 114. The regression model 114 processes the extracted values for a given domain to generate a malicious activity risk score for that domain. Additional malicious activity scores are generated in a similar manner for respective ones of a plurality of other domains.

The domains for which malicious activity risk scores are generated in the present embodiment illustratively comprise respective ones of the external domains 111. By way of example, these domains may more particularly comprise respective ones of a plurality of external fully-qualified domain name (FQDN) domains that are each contacted by one or more host devices of the enterprise.

The malicious activity risk scores indicate likelihoods that the respective domains are associated with malware. For example, the domains may be sources of malware. Additionally or alternatively, the domains may comprise malware-controlled domains. As a more particular example, a domain associated with malware may comprise a command-and-control ("C&C") domain that malware on an enterprise host communicates with in order to receive further instructions.

In some embodiments, the regression model 114 is trained on a training set that comprises a plurality of benign or unclassified domains and a plurality of domains previously classified as malicious domains but that excludes a global whitelist of popular domains. Such an arrangement facilitates the detection of domains associated with malicious activity from a potentially very large number of unknown domains. Other types of training sets can be used in other embodiments.

Examples of particular types of regression models that can be utilized in illustrative embodiments include a random forest model, a logistic regression model and a decision trees regression model. However, embodiments of the invention are not limited to utilizing these particular types of regression models, and accordingly the regression model 114 may be replaced in other embodiments with a linear model, a Poisson model, a Bayesian model or another type of regression model.

As noted above, the regression model 114 incorporates a plurality of internal and external features.

With reference now to FIG. 3, an example set of internal features is shown. The internal features in this example set are illustratively organized into seven distinct categories, including communication related features, domain structure related features, uniform resource locator (URL) related features, user agent (UA) related features, result code related features, referrer related features, and content type related features.

The communications related features comprise a total number of hosts, a total number of connections, an average, maximum or minimum number of connections per host, a total number of bytes sent, a total number of bytes received, an average, maximum or minimum ratio of total number of bytes sent and total number of bytes received on a per host basis, a total number of POST and GET connections, and an average, maximum or minimum ratio of POST and GET connections on a per host basis.

The domain structure related features comprise a domain name length, a number of domain levels, a number of sub-domains, and a top-level domain.

The URL related features comprise a total number of distinct URLs, an average, maximum or minimum path length per URL, an average, maximum or minimum path depth per URL, a total number of parameters, an average, maximum or minimum number of parameters per URL, an average, maximum or minimum number of values per parameter, a fraction of URLs with file name or extension, a total number of file names and extensions, a fraction of URLs with query strings, a fraction of URLs with fragments, a total number of fragments, and a fraction of domain URLs.

The UA related features comprise one or more of a total number of UAs, a ratio of distinct UAs over hosts, an average, maximum or minimum number of UAs per host, a fraction of connections without a UA, a fraction of unpopular UAs, an inverse average UA popularity, a dominant browser type, an average number of browsers per host, a dominant operating system (OS) type, and an average number of OSs per host.

The result code related features comprise a fraction of connections having particular predetermined result codes, a number of connections having particular predetermined result codes, and a ratio of failing connections and successful connections.

The referrer related features comprise at least one of a fraction of connections without a referrer, a number of distinct referrer domains, a ratio of distinct referrer domains and hosts, an average, maximum or minimum number of referrer domains per host, and a different referrer domain than itself indicator.

The content type features comprise a number of distinct content types, and a fraction of content types in each of a plurality of categories.

These particular internal features are examples only, and additional or alternative features can be used in other embodiments. Each of the seven categories specified in FIG. 3 includes multiple distinct internal features. As mentioned previously, these internal features illustratively comprise respective features of HTTP log data stored in database 106, such as HTTP header information from web proxy logs. Additional details regarding the various internal features of each of the categories of FIG. 3 will be provided elsewhere herein.

Turning now to FIG. 4, an example set of external features is shown. The external features in this example set are illustratively organized into three distinct categories based on respective distinct external data sources. The external data sources in this example include a WHOIS data source, a hosting type data source, and an IP geolocation data source.

The external features accessible from the WHOIS data source illustratively comprise registration related features. More particularly, these external features comprise a registration age, a registration validity, an update age, an update validity and a registration email category.

The external features accessible from the hosting type data source illustratively comprise hosting type features a free-hosting indicator, a dynamic domain name service (DNS) indicator, and a shortener indicator.

The external features accessible from the IP geolocation data source illustratively comprise autonomous system related features and country related features. More particularly, the autonomous system related features comprise autonomous system numbers (ASNs) of resolved domain IP addresses, and a number of distinct ASNs. The country related features comprise countries of resolved domain IP addresses, and number of distinct countries.

Again, these particular features are examples only, and additional or alternative features can be used in other embodiments. Each of the three categories specified in FIG. 4 includes multiple distinct external features. As mentioned previously, these external features illustratively comprise features that are accessible from one or more of the external data sources 107. Additional details regarding the various external features of each of the categories of FIG. 4 will be provided elsewhere herein.

It should be noted that a given implementation of regression model 114 illustratively incorporates selected ones of the above-described internal and external features that are determined to be most indicative of malicious activity, as will be described in more detail below. Additional or alternative subsets of the internal and external features of respective FIGS. 3 and 4 may be incorporated into the regression model 114 in other embodiments.

In the present embodiment, the regression model 114 incorporating the designated internal and external features for detection of malicious activity can be generated in the risk score generator 110, or in another portion or portions of the network security system 105 or computer network 100. For example, it is possible for the regression model 114 or portions thereof to be generated in an entirely separate system and downloaded into or otherwise provided to the risk score generator 110.

The regression model 114 in some embodiments is generated by identifying potential internal and external features indicative of malicious activity, obtaining data indicative of actual malicious activity for respective domains, determining correlations of the data indicative of actual malicious activity with respective ones of the potential malicious activity related internal and external features, selecting a subset of the potential malicious activity related features based on the correlations, and configuring the regression model to incorporate the selected subset of the potential malicious activity related features. The data indicative of actual malicious activity for respective domains can be obtained, for example, from the database 106 or other stored information of the network security system 105. Additional details regarding an exemplary regression model generation process of this type will be provided below, although other regression model generation processes can be used.

Returning now to FIG. 2, the malicious activity risk scores generated for respective domains are processed in step 206 to identify a subset of the domains having malicious activity risk scores above a specified threshold. The subset of domains can be determined, for example, as the top N domains out of a total population of 10N or 100N domains for which malicious activity risk scores are generated. Accordingly, the threshold may be specified as the risk score that separates the top N most likely malicious domains from the remaining domains. Alternatively, the threshold may be specified as a particular risk score value that is predetermined before generation of the risk scores for the respective domains.

In step 208, one or more proactive security measures are taken to prevent malware infection from the identified subset of domains.

Steps 206 and 208 in the present embodiment provide one example of a manner in which one or more proactive measures are taken to prevent malware infection in one or more of the host devices based at least in part on the malicious activity risk scores. Other arrangements can be used to trigger proactive measures based at least in part on malicious activity risk scores determined in the manner described herein. For example, in some embodiments, investigation of alerts generated by various security products deployed within the enterprise can be prioritized based on the malicious activity risk scores. As mentioned previously, incident response teams have limited capacity for handling security incidents, and prioritization of alerts can help in focusing on the most relevant, highest-risk incidents.

The above are only examples of some types of proactive measures that can be taken based on malicious activity risk scores, and numerous other types of proactive security measures can be taken in other embodiments.

In step 210, the regression model 114 is updated. For example, the model can be updated to reflect additional or alternative features associated with particular ones of the domains determined to have high malicious activity risk scores relative to other ones of the domains. This allows the model to be "tuned" over time to the particular security conditions facing a particular enterprise.

Additional instances of steps 200 through 210 can be performed on a regular basis or otherwise repeated periodically in order to ensure that those domains most likely to be associated with malicious activity continue to be targeted for proactive measures.

Numerous other techniques can be used to determine risk of malicious activity for external domains based at least in part on one or more regression models generated and applied in the manner described above.

Figure 2:
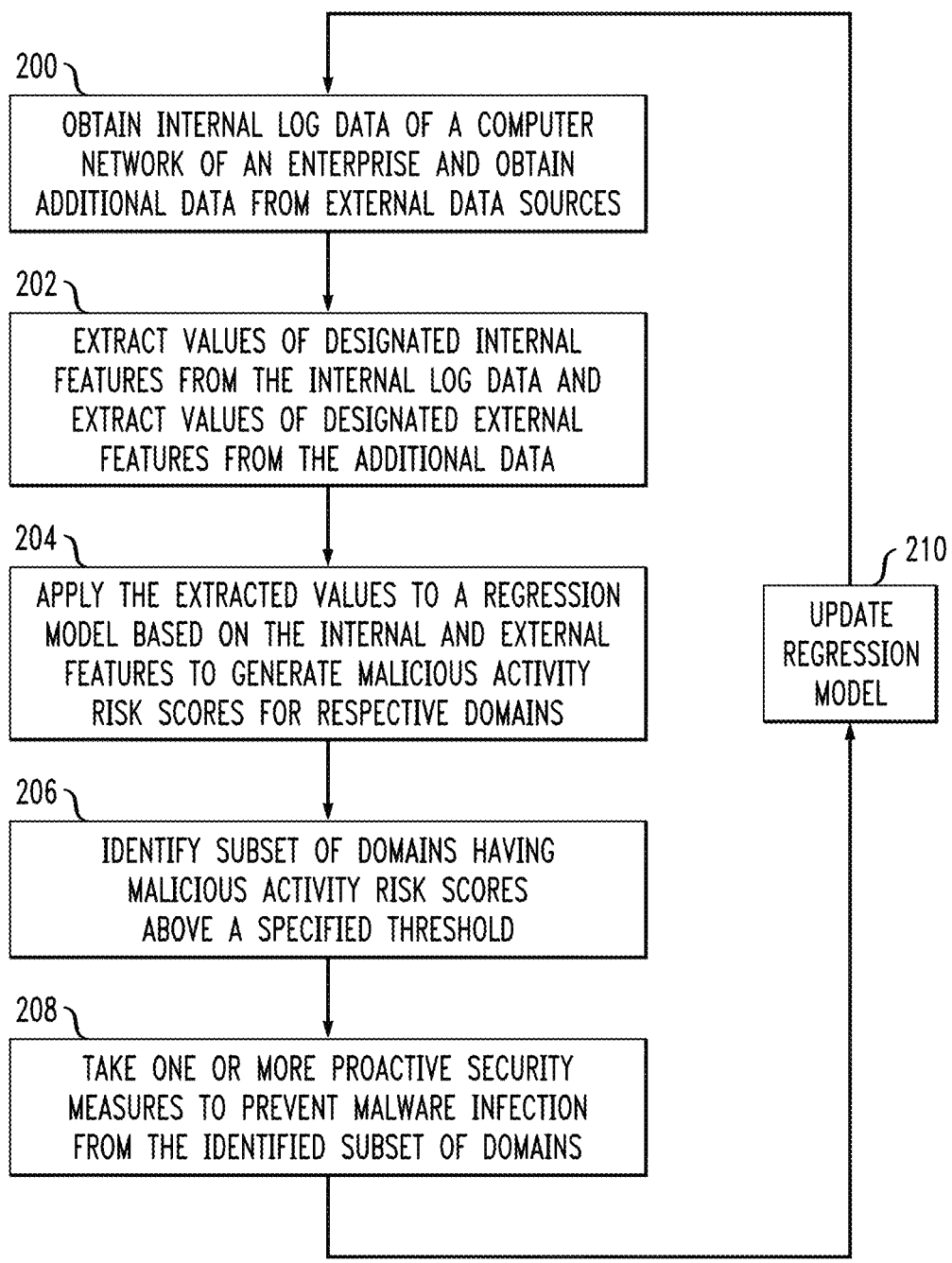
FIG. 2 is a flow diagram of an example process for detecting malicious web activity in the computer network of FIG. 1.
Figure 7:
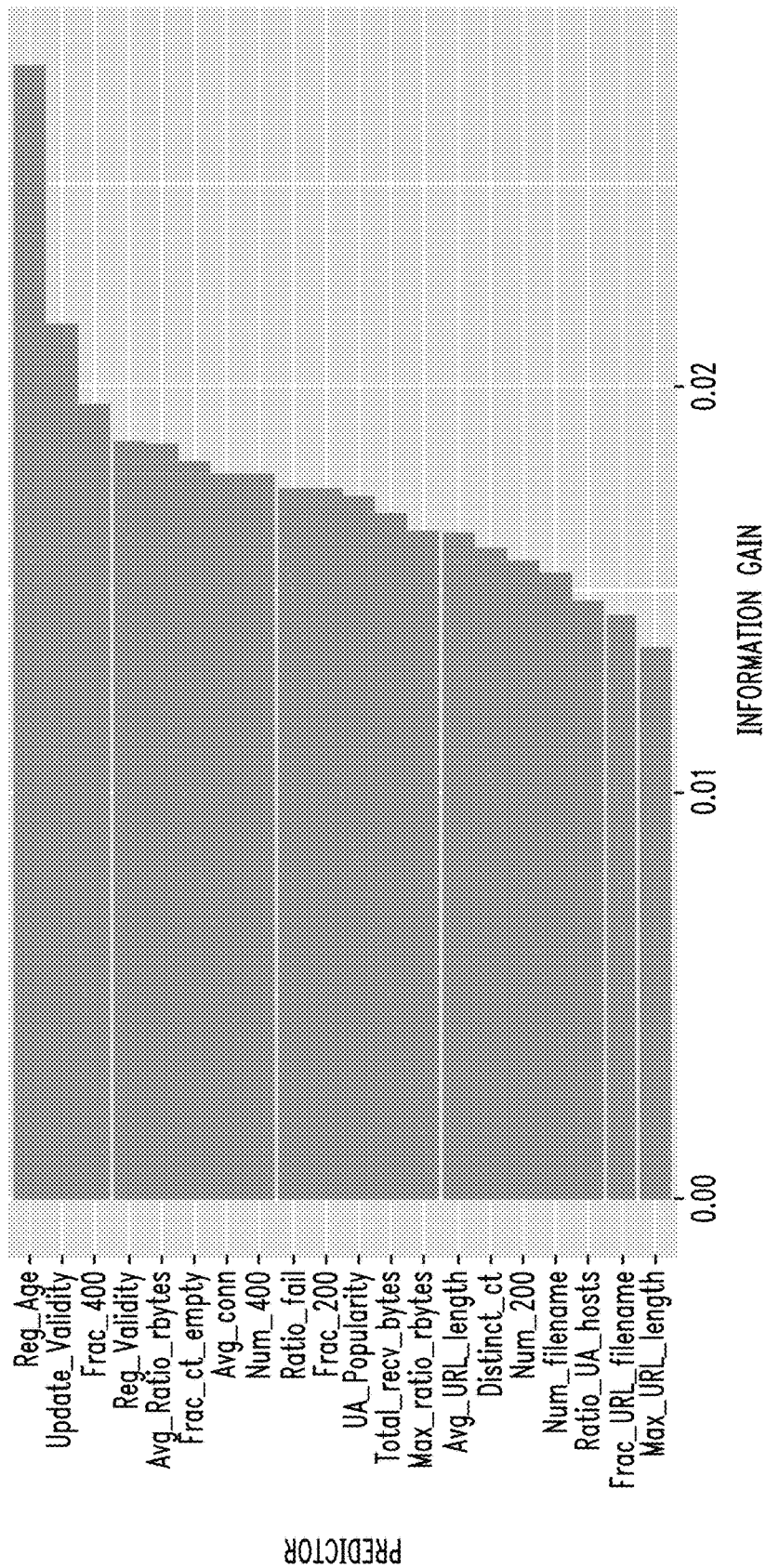
FIG. 7 shows a subset of numerical features from the example sets of internal and external features of FIGS. 3 and 4 with the numerical features being ranked in order of decreasing information gain.

Accordingly, the particular processing operations and other network functionality described in conjunction with the flow diagram of FIG. 2 are presented by way of illustrative example only, and should not be construed as limiting the scope of the invention in any way. Alternative embodiments can use other types of processing operations to detect malicious activity in a computer network. For example, the ordering of the process steps may be varied in other embodiments, or certain steps may be performed concurrently with one another rather than serially. Also, as indicated previously, the process steps or subsets thereof may be repeated periodically in conjunction with respective distinct instances of malicious activity detection within a computer network.

A more detailed example of a particular illustrative embodiment will now be described with reference to FIGS. 3 through 8. This example describes the generation of a regression model based on particular internal and external features as well as application of the regression model to the detection and remediation of malicious activity. The embodiment is also referred to as MADE, for "Malicious Activity Detection in Enterprises." It is to be appreciated that the particular details of this example are illustrative only, and other embodiments can be configured using alternative techniques.

The embodiment to be described assumes that a given enterprise collects various types of log data from the security products deployed in the environment. For example, web proxy logs are a rich data source containing records for all web activity initiated by enterprise hosts. The present embodiment utilizes this data in conjunction with additional data obtained from external data sources in order to detect malicious activity potentially prior to any significant malware infection from the associated domains.

In implementing this illustrative embodiment, we obtained almost four months of HTTP log data collected by web proxies at the border of a large enterprise network with over 100,000 hosts. The logs include fields such as connection timestamp, IP addresses of the source and destination, full URLs visited, HTTP method, status code, UA string, and web referrer. We utilized this dataset to find features most indicative of malicious activity in an enterprise setting and developed machine learning regression models for prioritizing the most suspicious network connections.

The process applied in this illustrative embodiment includes operations for data collection and labeling, feature construction, statistical modeling, and evaluation, each of which will be described in separate sections below.

The process involves gathering hundreds of features or attributes for external domains observed in our HTTP log dataset. We complement features extracted from HTTP logs with additional attributes available from public data sources, e.g., domain registration information from WHOIS data and ASN information from MaxMind. We do not employ lexical features or features related to timing patterns since these can be easily evaded by attackers.

Obtaining ground truth information for applying supervised machine learning models in computer security is challenging and relying on unsupervised methods (e.g., outlier detection) usually results in large number of false positives. Since most malicious activities detected within an enterprise are already blocked or quarantined, we are mainly interested in a set of malicious connections not detected by current defensive mechanisms in the enterprise of our study. Using VirusTotal, a cloud anti-virus service aggregating information from dozens of anti-virus engines, we found in our data more than 2000 domains flagged by at least three anti-virus engines. We use this list of domains as malicious examples and domains with no report from VirusTotal as legitimate ones.

Utilizing the labeled dataset containing in total more than 100K domains (among which more than 2000 are marked as malicious), and hundreds of features, we use statistical methods (e.g., lasso regularized logistic regression and information gain) to rank the features most indicative of malicious activities. We experiment with three different predictive models (random forest, regularized logistic regression and decision trees) for predicting most suspicious network activities, and we show the performance of each model. Since our goal is prioritizing the most suspicious network connections, we use metrics such as gain, lift and precision of the top predicted domains for comparing different models.

Once we choose the best performing statistical model and the highest ranked features, we build the final model on the training set and test it on a month of new data. We investigate the connections identified as most suspicious in the testing set, using a variety of techniques (e.g., match against various blacklists, manual analysis). We found that MADE achieves high accuracy in the top predicted domains, with 97 out of the top 100 domains confirmed malicious. MADE also identified over one hundred suspicious domains not yet reported by VirusTotal.

Data Collection and Labeling

We obtained a dataset including HTTP logs collected from a large enterprise spanning the period from February 6 to March 31 and July 1 to Aug. 31, 2015. We used the two-month data from July and August for training and validating our models, and the data from February and March to augment the list of malicious domains. In total, 3.8 M external domains (in this case fully-qualified domain names or FQDNs) were contacted by enterprise hosts during July and August. For each domain, we had access to fields extracted from HTTP proxy logs (connection timestamp, IP of source and destination, URL, result code, content type, UA string, web referrer), as well as the first date the domain was observed on the enterprise network.

We restrict our attention to recent domains in the dataset, which were first observed on the network within the previous two weeks. This choice is justified by the fact that the lifetime of most malicious domains is limited to several weeks.

We extracted all recent domains from the dataset, resulting in 1.2 M domains and we applied several filters to obtain our final dataset used in the statistical analysis:

1. We filter out all domains contacted by more than 50 enterprise hosts per day, as most enterprise infections compromise a few hosts and popular domains are in general related to reputable services.

2. We filter out third-party advertisement domains using EasyList and EasyPrivacy. Most of the domains in the two lists are owned by legitimate advertising companies but are associated with a massive number of connections. We remove them to reduce the amount of data for processing.

3. We filter out known content delivery network (CDN) domains using several lists since CDN traffic is most of the time legitimate, but exhibits different patterns than other legitimate domains.

4. Since a large number of our features are aggregated values, we restrict our attention to domains with at least 5 connections in the observation period. Due to repeated connections, we have more confidence in the values of the aggregated features.

5. As we are interested in detecting suspicious communications initiated by enterprise hosts, we filter out a small list of benign domains, those in Alexa top 10K retrieved at the beginning of July 2015. Given the popularity of these domains and the type of services they offer (e.g., social networks, news sites, online mail, etc.), their traffic patterns differ significantly from other legitimate domains.

After applying these filters, we queried all remaining 422K domains to VirusTotal. We consider malicious all domains flagged by at least three anti-virus engines in VirusTotal. In total we labeled 1356 domains as malicious, representing 0.32% of all recent domains contacted during that time interval. We consider unknown the domains with a score of 0 on VirusTotal. The domains with scores 1 or 2 are most likely related to low-profile adware or spyware campaigns.

We split our dataset into training and testing sets, according to time. The training set includes unknown and malicious domains from July 2015, while the testing set includes all domains from August 2015. To address the large class imbalance problem, we first augment the training set with malicious domains contacted in February and March 2015 (1152 in total). Second, we restrict the number of unknown domains in both training and testing sets to 50K domains sampled at random from the domains contacted in July and August 2015. We believe that this is a large enough set representative of typical legitimate connections. We did not include any domains with VirusTotal score of 1 or 2 in the training set to lower the risk of introducing false positives to the set of malicious domains, but the testing set includes all domains in August.

For all resulting domains, we extract the features detailed below. Aggregated features (e.g., number of distinct user-agent strings, average URL length or depth, maximum number of connections) are computed over all connections to a domain established in the two-week interval after the domain was first observed in the enterprise.

Feature Construction

In this section, we describe the features we used for prioritizing suspicious connections. The majority of the features are extracted from the HTTP proxy logs commonly collected at the perimeter of enterprises, and we call them internal features. In particular, we consider the common attributes available in HTTP requests and responses (e.g., URL, UA string, web referrer, result code, content type) and aggregate them by domain name. Further, we apply different operators on these attributes (e.g., count, average, maximum, minimum, sum) to construct a large number of features.

To complement the internal features, we also issue queries on the domain names and associated IP addresses to a number of external sources and extract additional external features. These include features related to domain registration, IP geolocation and ASN number. In contrast to conventional approaches, none of our features leverage existing knowledge about the reputation of the domains or IP addresses (e.g., membership on public blacklists). This allows us to capture malicious activities besides known campaigns.

Internal Features

As mentioned previously, FIG. 3 shows an example set of internal features grouped into seven categories. Below we describe these internal features in more detail.

Communication Statistics.

We compute statistics about communication structure for domains contacted by enterprise hosts. Specifically, we count the number of hosts contacting the domain and compute several statistics per host (Avg/Min/Max/Ratio) and in aggregation for several attributes, including bytes sent and received, and POST and GET connections. As expected, legitimate domains are more popular than malicious domains since they are visited by a larger user base and receive more requests for web content. It was found that less than 40% of malicious domains, but more than 60% of legitimate domains have more than 20 connections in the training set. For legitimate web sites, usually more content is received than sent by end hosts. Also, the ratio between bytes sent and received differs greatly for the malicious and legitimate domains. For more than 70% of malicious domains, but only 40% of legitimate domains, the ratio is less than 20.

Domain Structure.

Malicious domains are not uniformly distributed across the available TLDs (top-level domains). It's a known strategy for attackers to register their domains on inexpensive TLDs to reduce their cost of operation. As such, we extract the TLD from the domain name and consider it as a categorical feature. We also look into the number of levels in the domain, the number of sub-domains on the same SLD (second-level domain) and domain name length. These features should be distinguishing for CDN and cloud services, which typically include a larger number of sub-domains and levels than malicious domains.

URL.

To bypass the common policies established by enterprise proxies and firewalls, malware is increasingly designed to communicate with external destinations (e.g., command-and-control or "C&C" servers) by manipulating URLs. URL path (the substring after domain name), folders (strings segmented by '/' within path and we denote the number of such strings as URL depth), file name, extension, parameters and fragment fields are all popular attributes to update host status or exfiltrate host configurations. Therefore, we calculate the overall statistics per URL for these attributes, and consider high values as an indication of suspicious activity. For the same purpose, we count the number of distinct URLs, and fraction of URLs with a query string under the given domain.

In contrast, a high rate of domain URLs (URLs without path, query string and fragments) is also abnormal, suggesting the domain is not designed to deliver web content, and we count the fraction of domain URLs among all URLs. Within each URL, we also extract file name and file extension from URL path, since web pages under a site usually contain file names (e.g., index.html). A low ratio of URLs with file name and extension suggests the domain is not intended for web browsing and is therefore more suspicious. Another set of features of interest are related to parameter values, as a large number of values for a parameter might suggest the URL is used for communication with malware control domains.

The evaluation on the training set shows the malicious and legitimate domains differ greatly in these features. As an example, there is a higher chance for the malicious domains to serve longer URLs than legitimate domains (especially when the length is more than 100). In addition, very short URLs (for instance when a domain URL is used) are also correlated with malicious activity.

User Agent.

User agent (UA) string is also exploited as a channel for command and data transmission. Therefore, we inspect UAs from different perspectives. First, we count the number of UAs seen under the given domain and statistics per host. Since the host machines within an enterprise tend to install similar software, a domain contacted with a large number of distinct UAs is unusual. In addition, an HTTP request without UA is most likely not related to normal user browsing and we count the fraction of such connections. Third, we build a history of UAs observed over a month-long period in the training set and consider a UA as popular if it has been used by at least 10 hosts. Then, we compute the fraction of unpopular UAs and an inverse average of UA popularity. Assuming that n UAs ($UA_1, UA_2, \ldots, UA_n$) are used by ($X_1, X_2, \ldots, X_n$) hosts separately in the UA history, the inverse average is computed as $$\sum_{i=1}^{n} \frac{1}{X_i}.$$

Unpopular UAs are more likely fabricated by malware and we consider high fraction and inverse average as indications for malicious activities. We evaluated this observation in our dataset and it turns out that 15.2% of malicious domains and only 1.5% of legitimate domains in the training set are contacted through unpopular UAs solely.

Since the information about OS and browser is usually embedded within the UA, we parse the UA string and extract these two fields to determine if certain OSs and browsers are more likely to access malicious domains. Internet Explorer and Windows XP turn out to be the most vulnerable browser and OS in our dataset. Particularly, Windows XP is 5 times more vulnerable than other OSs. Therefore, we include browser and OS into our feature list.

Result Code.

We divide the result code from HTTP response into four categories (2xx/3xx/4xx/5xx) and compute the fraction and total number of such connections for each category. Since malicious domains tend to be taken down quickly by hosting providers/registrars or terminated periodically to hide from web scanners run by security companies, more failed connections (4xx/5xx) are usually observed. In addition, the firewalls/proxies deployed within enterprises tend to block access to unknown domains (the studied enterprise proxy responds with code 404 when blocking a request). Repeated visits to such domains resulting in high number of failed connections are likely attributed to software, especially malware, instead of humans. In fact, for 34.1% of the malicious domains in the training set, all connections were failed, which happens for only 4.9% of legitimate domains.

Referrer.

In normal web browsing a visit to a web page is usually referred by another URL, and as such, requests with an empty referrer are prone to be issued by automated processes. Since software installed on hosts is restricted within the enterprise and popular domains have been pruned from our dataset, the remaining domains contacted with an empty referrer are more suspicious. Web servers can remove referrer in requests by browser through meta refresh or JavaScript for privacy concerns, but it happens rarely. We confirmed that in our training set, 24.5% malicious domains were visited without referrer in place, compared to only 4.3% benign domains. Hence, we compute the fraction of such connections. In addition, we look into the diversity of the web referrer domains across connections. Since we have filtered out popular advertising/tracking/CDN services and popular sites, a large number of referrer domains or high ratio of referrer domains to hosts suggest that the domain might be exploited by malware or used as central point to coordinate compromised sites. Therefore, we add the features about diversity of referrer domains into our list.

Content Type.

A large number of content types on a domain suggests the domain might not be used to deliver regular web content. Moreover, certain content types (e.g., .exe and .jar) have higher associations with malware and exploits. To capture this, we consider the number and fraction of URLs within each category (html, java script, application, image, video, text).

External Features

As mentioned previously, FIG. 4 shows an example set of external features grouped into three categories. We leverage these external resources (e.g., public services and lists) to enrich the knowledge about the domains contacted by enterprise hosts. Below we describe these features in detail.

WHOIS.

Domain WHOIS information is a useful indication of malicious activity. Following this trail, we issue WHOIS lookups for all the monitored domains and extract registration/update/expiration dates and registrant email for detection. We compute the number of days since registration as registration age and the number of days till expiration as registration validity. Similarly, we compute the number of days since the latest update as update age and the number of days from update till expiration as update validity. Due to attackers' typical use of short-term domain registration to reduce operational cost, the age and validity of malicious domains are usually much shorter than those of legitimate ones. The distribution of registration dates of the domains in our training set strongly supports this argument: the mean registration age and validity for malicious domains are 191 and 366 days, as compared to 2404 and 2927 days for legitimate domains. We also examine the registrant email and classify its hosting services (substring after '@') into 5 categories: personal (if the service is mainly for personal use, e.g., gmail.com), private (if the domain is registered using private registration service, e.g., domainsbyproxy. com, domain (if the server name equals to domain name), empty (if there is no email available) and other. Some categories, e.g., personal or private, have a higher chance of association with malicious domains.

Hosting Type.

We retrieve public lists of known free-hosting providers, dynamic DNS and URL shorteners from malware domains. com and match them against the monitored domain names. If the second-level domain name appears in the list, we consider the domain matched. Attackers abuse free-hosting providers and dynamic DNS for domain fluxing and URL shorteners as redirectors, and the domains using these services are more suspicious.

IP Address Geolocation.

Malware is not uniformly distributed across geographies, with some countries and ASNs hosting more malicious infrastructures. In our dataset, the infection rates for different countries and ASNs demonstrate heavy-tailed distributions. Interestingly, the ASNs with highest ratios of malicious domains are related to hosting and cloud services.

We resolve the IP addresses associated with monitored domains and map them into ASNs and countries according to Maxmind. We include the ASN and country as categorical features, and also the number of ASNs and countries as numerical features. Intuitively, higher diversity of ASNs and countries might indicate IP fluxing, a popular technique to hide the attackers' services or avoid being taken down by administrators.

Statistical Modeling

In this section we describe our statistical analysis methodology. We start by describing the results of applying a combination of feature ranking methods for categorical and numerical attributes. We then consider models with different number of features and determine how many features are sufficient in building an accurate predictive model for suspicious activities. Finally, we evaluate three regression methods and show the benefit of using a random forest model for prioritizing the most suspicious activities.

We collected a large number of features (89) from our dataset and external sources as described previously. Our first goal is to rank them and determine which ones are highly indicative of suspicious activity. Our dataset includes two different types of features. Most of them are numerical features with integer values, but our dataset also includes a small set of categorical features (ASN, Country, TLD, OS, Browser and category of registration email from WHOIS records). Categorical features can be represented in a standard manner with a set of binary features, one for which feature value. Among our categorical features, ASN has the largest number of distinct values (more than 3000).

Some feature selection models (e.g., information gain or importance computed by random forest classifier) are tailored to numerical data, while others (e.g., regularized logistic regression) are more applicable to datasets with sparse binary features. We thus used a combination of two methods in a two-step feature ranking procedure:

1. Ranking categorical features: We represent each of our six categorical features as a set of binary features. More specifically for a particular feature $C_i$ having $v_i$ distinct values, we construct $v_i$ binary features $B_1, \ldots, B_{v_i}$. We then apply lasso regularized logistic regression (denoted regularized LR or simply LR) to select the relevant binary features. The regularization method is a well-known technique that encourages sparse solutions in which many coefficients (or feature weights) are set to zero. The binary features with non-zero coefficients are considered relevant.

FIG. 5 shows the number of binary features considered initially for our six categorical features, and the number of features selected by LR. The analysis was performed on the training set using 10-fold cross validation with two-thirds of the data used for feature ranking and model construction and one-third for evaluation. The table in this figure shows the maximum number of binary features that were selected in the 10 cross validation experiments. FIG. 6 provides further insight into the binary features that had higher weight according to LR. These results confirm most of the insights gained from the measurement performed in the previous section.

2. Ranking numerical and binary features: We generated a new dataset including the 83 numerical features in our original dataset and 282 relevant binary features selected from the LR method above, in total 365 predictors. For ranking this set of numerical predictors, we choose to use a feature ranking method based on information gain. We compute feature ranking based on information gain in each cross validation fold and then determine average feature ranking across folds.

Among our 365 features, 106 predictors had an information gain greater than 0 in at least one round of cross validation. Overall, 42 features had a gain greater than 0.01. We show the average ranking of the top 20 predictors based on information gain in FIG. 7. Interestingly, we observe that features from most categories we considered (communication structure, UA, URL, content type, result code as well as external features) are ranked in the top 20 predictors. It can be seen that domain age is the highest ranked feature and three WHOIS features (domain age, update validity and registration validity) are among the top 5 ranked by the method.

We now evaluate the number of predictors needed for optimizing the metrics of interest, as well as the choice of the appropriate predictive model for our problem.

Here we start by introducing the metrics used for our analysis, determine how many features are sufficient for high accuracy and finally compare three different predictive models with respect to our metrics of interest.

Determine Metrics.

The first question we address is which metrics should be used for evaluating different predictive models. We consider a predictive model M built on the training set, which applied to a domain d in the testing set predicts the probability M (d) the domain is malicious. The higher the predicted probability M (d), the more suspicious the domain is considered.

Classifying all domains observed in an enterprise with high accuracy and low false positives is extremely challenging in our setting due to a number of reasons. First, our dataset is imbalanced, with less than 1% of domains being labeled as malicious. Additionally, the amount of ground truth information used for creating domain labels is limited and not entirely accurate. Among the large number of domains not reported by VirusTotal, a certain percentage might be malicious, since anti-virus scanning does not have full coverage of all malicious events. Orthogonally, some fraction of domains reported by VirusTotal are false positives or related to low-profile adware campaigns.

A challenge we encountered is that most domains observed in the enterprise traffic are unknown. Most previous work addressing a similar problem of predicting malicious domains considers two well-defined classes of domains: benign (e.g., top Alexa domains) and malicious. In such a setting, a classifier trained on these two classes of domains usually gives very good results. We performed an experiment in which we trained a random forest classifier on a list of benign domains (with Alexa rank in top 10K) and the list of malicious domains in the training set. We obtain over 92% F1 score (a combination of precision and recall).

Nevertheless, our operational setting is quite different: we aim to prioritize the most suspicious domains among a large set of unknown domains. In our dataset, Alexa top 10K domains represent about 10% of traffic, and malicious domains are less than 1%. The remaining domains are unknown. A model trained on a small number of benign and malicious domains will not be successful in prioritizing the suspicious domains in the unknown class.

With these insights, we utilized a different approach in the present embodiment. Since our goal in this embodiment is prioritizing the most suspicious activities, which can then be provided for analysis to the enterprise's incident response team, we are interested in achieving high accuracy on a small set of most suspicious activities. We whitelist the most popular benign domains (e.g., Alexa top 10K), and focus on prioritizing the malicious domains among the large set of unknowns. For this task, we build several predictive models based on different regression methods (e.g., random forest, lasso regularized logistic regression, and decision trees) trained on the set of unknown and known malicious domains.

We adapted several metrics of interest used in machine learning for such scenarios including precision in the top predicted domains, gain and lift. More specifically, we rank the domains with highest predicted probabilities by a certain predictive model and define $D_x$ as the set of x domains d with highest predicted probabilities M (d). The metrics we consider are: precision, defined in our case as the ratio of true positives in set $D_x$ of top predicted domains; lift, defined as the ratio between the precision of the model compared to random guessing over the target population of x top predicted domains; and gain, defined as the true positive rate (or recall) in the target population.

Determine Number of Features.

Next, we determine the minimum number of features among the 365 in the final list required for optimizing our metrics. In machine learning, simple models with smaller number of features are generally preferred to overly complex models employing large number of features due to the risk of overfitting the model to the training set.

We ranked the list of 365 features according to information gain as described previously and selected the top n predictors for different values of n. We then build a random forest regression model with n predictors using 10-fold cross validation, and determine the precision, lift and gain for n∈{10,20,40,80} in a random forest model. Results are averaged across the 10 runs in cross validation. While the precision for 10 predictors is at 100% for the top 75 domains, precision for the top 250 domains is improved from 80.4% with 10 predictors to 81.92% with 20 predictors and 84.4% with 40 predictors. Recall (or gain) in the 1% of the population is 63% for 40 predictors compared to 56% for 10 predictors, and 59% for 20 predictors. The lift in the 1% population (measuring the improvement in precision over random guessing) is a factor of 29 for 10 predictors and 30.6 for 40 predictors. The lift is still significant (at a factor of 5) in the 10% of the population, independent of the number of predictors.

Interestingly, when using more than 40 predictors the prediction accuracy with respect to all the metrics does not improve much. This is explained by the fact that features with average rank higher than 40 have low information gain (below 0.01). Based on this analysis, we choose the 40 highest ranked predictors in our model.

Determine Predictive Model.

Figure 8:
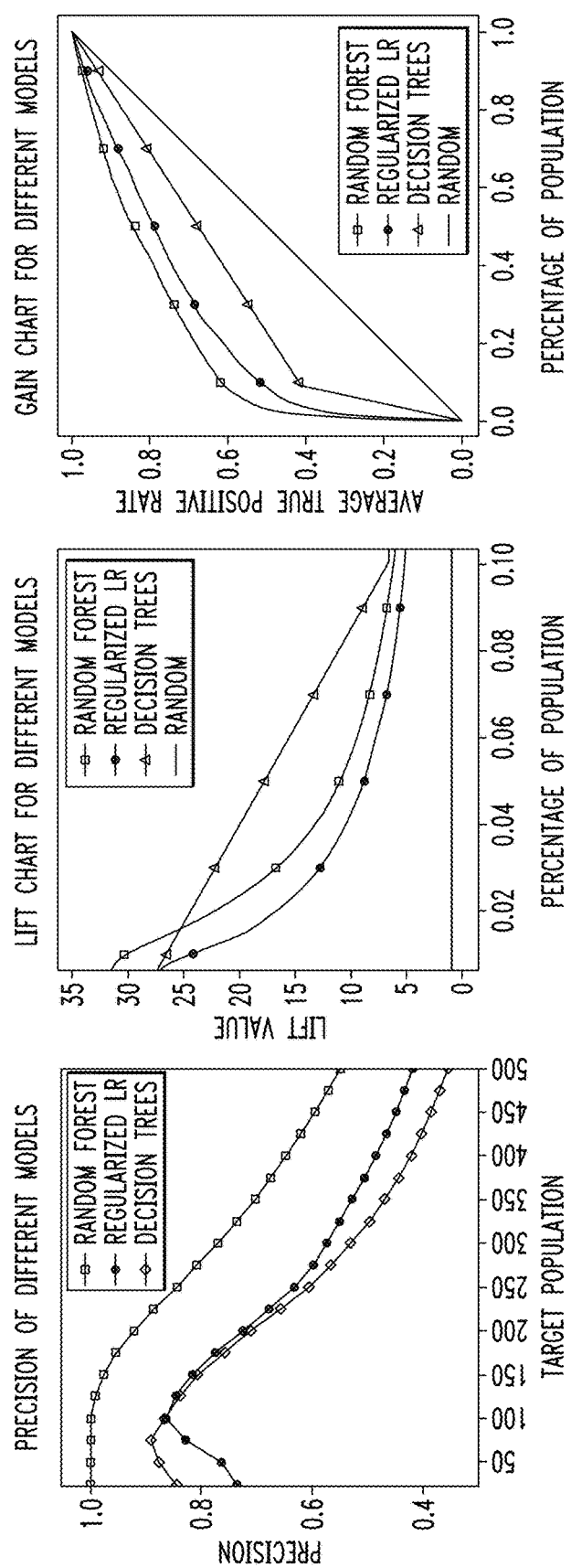
FIG. 8 compares precision, lift and gain for three different regression models used in detecting malicious web activity in illustrative embodiments.

Finally, we experiment with three different statistical models (random forest, lasso regularized logistic regression and decision trees) to understand various tradeoffs. The graphs in FIG. 8 show the precision, lift and gain for the three models using the 40 highest ranked features. Notably, the random forest classifier is outperforming the other two models for the metrics of interest. The random forest precision is above 95% in the top 175 domains, but the precision of LR and decision tree degrades to 77.42% and 75.77%, respectively for the same number of domains. The gain of random forest is at 62% for 1% of the population, but only 52% and 42%, respectively, for LR and decision trees. The lift metric is still superior for random forest (at 30.4) in the 1% of the population compared to 24 for LR and 26.5 for decision trees. The lift of random forest starts to degrade compared to decision trees for more than 2% of the population, but we are mainly interested in optimizing our metrics for the top 1% of the population. In light of the above analysis, we choose for the present embodiment a random forest model with top 40 predictors. Other embodiments can use different regression models with different numbers of internal and external features.

Evaluation

In this section, we describe the approach we take to evaluate the effectiveness of MADE on new data. Our testing set comprises 53,216 external domains (after filtering) contacted by internal hosts during August 2015 and their corresponding features. We apply the random forest classifier with the top 40 features selected and weighted in the training process on the domains in the testing set. We then validate the detected domains by combining automated and manual analysis. We first describe our validation methodology and then the result on the testing set. Finally, we show a malware campaign discovered through investigating some of the detected domains.

Validation Process.

We run our random forest regression model and generate a list of 1000 domains from the testing set with highest predicted probabilities. We submitted all the detected domains to VirusTotal in September 2015 and October 2015 (to allow anti-virus engines to catch up with new malware). A detected domain is considered as suspicious (or true positive) if it is reported by at least one scanner. For the domains not explicitly flagged by an anti-virus engine, we first retrieve and analyze the detailed VirusTotal domain report. If according to the report, a domain serves malicious URLs, is contacted by malware, is used to deliver malware, is parked, unreachable or alarmed by other partner services (e.g., Opera, BitDefender and Malwarebytes), we consider it as suspicious.

Still, a number of domains were left unlabeled. We carried out manual investigation under the guidance of the incident response team at the organization. In particular, we issue HTTP requests to the domain name to download the home page and check if malicious payload is embedded. If no valid web page is returned, we search for incident reports about the domain and also check if the domain is generated through a domain generation algorithm (DGA). A domain meeting one of these criteria is considered suspicious as well. Moreover, since the proxy deployed at the enterprise perimeter assigns reputation scores for each URL, we leverage low reputation scores as an indication of suspicious activity.

Results on Testing Set.

MADE is designed to assign scores to examined domains and prioritize the high-risk domains for further investigation by security experts. An important evaluation metric is whether the malicious domains receive higher scores than legitimate unknown domains. To this end, we compared the scores received by unknown and suspicious domains in the testing set and found that the scores assigned by MADE meet the above requirement. More than 50% of suspicious domains have score higher than 0.2, comparing to less than 10% of unknown domains. Further, a score threshold of 0.4 captures around 20% suspicious domains and only 2% unknown domains.

Also, it was found that MADE reached very high precision for the top 100 domains. More particularly, for the top 100 domains, 72 domains are directly confirmed by Virus-Total, and 12 and 6 domains are confirmed by analyzing domain report and manual investigation individually. Within the remaining 10 domains, 7 of them have low reputation score, leaving only 3 domains as false positives, which leads to 97% precision for top 100 domains. The performance gradually degrades when considering more domains, with 66% precision for top 250 domains and 47.6% precision for top 500 domains. This result shows that MADE is capable of prioritizing malicious domains with the predicted probabilities.

Since none of features leveraged by MADE depend on existing domain and IP blacklists, a large number of domains detected by MADE are undetected by public scanners, i.e., all scanners employed by VirusTotal. In particular, 43 among the top 500 domains and 75 among the top 1000 domains are not detected by VirusTotal but confirmed by other means. Additionally, 48 and 108 among the top 500 and top 1000 domains have low reputation scores. Due to the time limit, we were only able to manually visit and search for incident reports for the top 100 domains. We expect the number of newly discovered domains will increase significantly if the investigation expands to a larger set of domains.

In some enterprise contexts, the number of domains that can be investigated is limited (e.g., to several hundred domains in a one-month period) due to network security resource constrains at the enterprise side. As shown by our evaluation, MADE is able to achieve high accuracy for the top predicted domains, thereby allowing network security personnel to focus their efforts on those domains most likely to be associated with malicious activity.

Case Study.

Below we elaborate on a malware campaign discovered by analyzing the traces associated with the detected domains in the testing set. In this campaign, the adversary registered 5 domains and created 8-9 subdomains under each to manage different communications for different stages. In total, 645 distinct hosts visited at least one such domain within a one-month period which were likely infected.

The second-level domains recruited for this campaign all had names consisting of three words or shorthands, which are probably generated through DGA. Traditional DGA creates domain names by combining random letters and digits, making the names unreadable and easily spotted by administrators. The domain names generated through this new DGA model look more legitimate and are more likely to slip under the eyes of security experts. The domains were registered in two batches on two different dates (Jun. 23, 2015 and Aug. 2, 2015) and operated in different time periods, in order to keep the campaign uninterrupted. Even though we have no access to the binaries delivered to the infected hosts, we were able to infer the names of downloaded adware by inspecting the delivery URLs. In fact, the adversary used the URL file name (e.g., a Chrome extension visualbee will be downloaded following the request http://download.maxdevzone.com/chrome/33906/0/0/0/visualbee.crx?ver=1.26.287 authuser=1) to specify which adware should be delivered. We found these domains were employed to deliver 8 distinct adware, all of which were Chrome extensions developed using an advertising kit CrossRider.

Next, we analyzed the infrastructure and operations of this adware campaign. The adware is delivered to victim's machine when she visits subdomains under prefix dl.* and download.*. After the extension is installed, it requests additional scripts from subdomains notif*, js.* and app.*. In response, the returned scripts will instruct the browser to follow certain monetization rules (e.g., what ad impression should be shown) based on the browser's profile, including the type of browser, geo-location, ad-campaign id and plugins installed, etc. The profile of the victim is also transmitted to logs.* for monetization reporting. The adware also frequently checks update.* for updating itself. The running status and errors encountered (e.g., hitting 403 page when updating plugin) are reported to stats.* and errors.*. All of the domains are hosted on two IPs owned by Highwinds network, except stats.* and errors.* which are hosted on two Amazon owned IPs.

MADE was able to capture 26 domains under this campaign, due at least in part to the following distinctive features.

1. All of these domains are registered quite recently and are shown in the enterprise network only after July.

2. The referrer field of all requests to the domains is either empty or contains the domain name itself, suggesting they are not visited through normal web browsing by humans.

3. A large number of URLs are served under each domain and a high number of parameters and parameter values are embedded, in order to send the status of the infected machines to the remote servers. In average, 418 URLs are served under each domain, 7 parameters are used per URL, and 72 values are used per parameter, comparing to 50, 2 and 3 under legitimate domains visited in the same period.

The MADE embodiment described above is based on rigorous evaluation of a large number of features correlated with generic malicious activities. These features are extracted from HTTP logs collected at a large organization, and external sources (e.g., WHOIS and IP address geolocation). MADE does not focus on a particular class of malicious activity, but is configured to predict the most suspicious connections independent of any exact threat vector. Moreover, it does not leverage lexical features, or timing patterns in communications, since both of these can be easily evaded by attackers.

The MADE embodiment described above analyzes the HTTP log data collected in an enterprise and predicts with high accuracy new malicious activities overlooked by conventional security products. In generating a regression model of the type used in MADE, we systematically evaluate and rank hundreds of features indicative of malicious connections extracted from HTTP log data and external sources. We also experiment with different predictive models and evaluate them according to several different metrics. The evaluation on one month of data demonstrates the effectiveness of MADE in discovering new malicious activities and closing the gap between "time-to-compromise" and "time-to-discover."

As mentioned previously, the particular regression model based on designated internal and external features as described above is determined based on actual enterprise data available from a particular enterprise, and other embodiments can utilize alternative models. For example, the particular features determined to be statistically significant may vary depending upon the particular configuration and other characteristics of a given enterprise as reflected in its available enterprise data.

The above-described illustrative embodiments provide significant advantages relative to conventional approaches.

For example, certain embodiments determine malicious activity risk scores for respective domains using a regression model that is based on potentially large numbers of designated internal features of HTTP log data of an enterprise as well as designated external features from additional data sources external to the enterprise. Such a regression model is trained over the designated internal and external features using a combination of unknown domains and known malicious domains, and provides highly accurate results that have been confirmed using actual internal HTTP log data and external data.

Using malicious activity risk scores determined for respective domains, a network security system can prioritize for attention those particular domains that are most likely to be associated with malware. This allows the network security system to conserve its limited resources, while also providing a significant reduction in the above-noted gap between "time-to-compromise" and "time-to-discover." Such arrangements supplement conventional security technologies and advantageously provide enhanced security against APTs and other types of attacks in enterprise computer networks.

Some embodiments provide accurate and effective detection of malicious activity utilizing security logs already being collected by an SIEM system or other type of network security system in conjunction with additional data readily available from publicly-accessible external data sources. Malicious activity risk score determinations based on a regression model can be run on a regular basis to determine the domains that are most likely to be sources of malicious activity and to take early proactive measures for those domains.

It is to be appreciated that the foregoing advantages are illustrative of advantages provided in certain embodiments, and need not be present in other embodiments.

The computer networks disclosed herein are illustratively implemented using one or more processing platforms, examples of which will be now be described in greater detail. A given such processing platform comprises at least one processing device comprising a processor coupled to a memory.

In some embodiments, portions of a computer network as disclosed herein illustratively comprise cloud infrastructure. The cloud infrastructure in some embodiments comprises a plurality of containers implemented using container host devices. More particularly, the cloud infrastructure in one or more illustrative embodiments comprises container-based virtualization infrastructure configured to implement Docker containers or other types of Linux containers (LXCs).

The cloud infrastructure may additionally or alternatively comprise other types of virtualization infrastructure such as virtual machines implemented using a hypervisor. An example of a commercially available hypervisor platform that may be used to implement portions of the computer network 100 in an illustrative embodiment is the VMware® vSphere® which may have an associated virtual infrastructure management system such as the VMware® vCenter™. The underlying physical machines may comprise one or more distributed processing platforms that include one or more storage systems.

The cloud infrastructure mentioned above may represent at least a portion of one processing platform. Another example of such a processing platform is a plurality of processing devices which communicate with one another over a network. The network may comprise any type of network, including, by way of example, a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an ASIC, an FPGA or other type of processing circuitry, as well as portions or combinations of such circuitry elements. The memory may comprise RAM, ROM or other types of memory, in any combination. The memory and other memories disclosed herein should be viewed as illustrative examples of what are more generally referred to as "processor-readable storage media" storing executable program code of one or more software programs.

As indicated above, articles of manufacture and other computer program products comprising such processor-readable storage media are considered embodiments of the present invention.

Also included in the processing device is network interface circuitry, which is used to interface the processing device with the network and other system components, and may comprise conventional transceivers.

As another processing platform example, portions of a given processing platform in some embodiments can comprise converged infrastructure such as VxRack™ or Vblock® converged infrastructure commercially available from VCE, the Virtual Computing Environment Company, an EMC Federation Company.

The particular processing platforms described above are presented by way of example only, and a given computer network such as computer network 100 may include additional or alternative processing platforms, as well as numerous distinct processing platforms in any combination, with each such platform comprising one or more computers, servers, storage devices or other processing devices.

Processing devices and other computer network components can communicate with one another using a variety of different communication protocols and associated communication media.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of internal and external features, security logs, databases, data sources, regression models, risk scores and proactive malware infection prevention processes may be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising steps of:
obtaining internal log data of a computer network of an enterprise;
extracting values of a plurality of designated internal features from the log data;
obtaining additional data from one or more external data sources;
extracting values of a plurality of designated external features from the additional data;
applying the extracted values to a regression model based on the internal and external features to generate malicious activity risk scores for respective ones of a plurality of domains;
identifying a subset of the domains based on their respective malicious activity risk scores; and
taking one or more proactive security measures against the identified subset of domains;
wherein the malicious activity risk scores indicate likelihoods that the respective domains are associated with malware;
wherein the designated internal features comprise one or more communication related features, one or more domain structure related features, one or more uniform resource locator (URL) related features, and one or more user agent (UA) related features;
wherein the designated external features comprise one or more registration related features, one or more autonomous system related features, and one or more country related features; and
wherein the steps are performed by at least one processing device comprising a processor coupled to a memory.

2. The method of claim 1 wherein the plurality of domains comprise respective ones of a plurality of external fully-qualified domain name (FQDN) domains contacted by host devices of the enterprise.

3. The method of claim 1 wherein the internal log data comprises HTTP log data stored in security logs of the enterprise and wherein the one or more external data sources comprise at least one of a WHOIS data source, a hosting type data source, and an IP geolocation data source.

4. The method of claim 1 wherein the one or more communication related features comprise one or more of a total number of hosts, a total number of connections, an average, maximum or minimum number of connections per host, a total number of bytes sent, a total number of bytes received, an average, maximum or minimum ratio of total number of bytes sent and total number of bytes received on a per host basis, a total number of POST and GET connections, and an average, maximum or minimum ratio of POST and GET connections on a per host basis.

5. The method of claim 1 wherein the one or more domain structure related features comprise one or more of a domain name length, a number of domain levels, a number of sub-domains, and a top-level domain.

6. The method of claim 1 wherein the one or more URL related features comprise one or more of a total number of distinct URLs, an average, maximum or minimum path length per URL, an average, maximum or minimum path depth per URL, a total number of parameters, an average, maximum or minimum number of parameters per URL, an average, maximum or minimum number of values per parameter, a fraction of URLs with file name or extension, a total number of file names and extensions, a fraction of URLs with query strings, a fraction of URLs with fragments, a total number of fragments, and a fraction of domain URLs.

7. The method of claim 1 wherein the one or more UA related features comprise one or more of a total number of UAs, a ratio of distinct UAs over hosts, an average, maximum or minimum number of UAs per host, a fraction of connections without a UA, a fraction of unpopular UAs, an inverse average UA popularity, a dominant browser type, an average number of browsers per host, a dominant operating system (OS) type, and an average number of OSs per host.

8. The method of claim 1 wherein the designated internal features further comprise one or more result code related features including at least one of a fraction of connections having particular predetermined result codes, a number of connections having particular predetermined result codes, and a ratio of failing connections and successful connections.

9. The method of claim 1 wherein the designated internal features further comprise one or more referrer related features including at least one of a fraction of connections without a referrer, a number of distinct referrer domains, a ratio of distinct referrer domains and hosts, an average, maximum or minimum number of referrer domains per host, and a different referrer domain than itself indicator.

10. The method of claim 1 wherein the designated internal features further comprise one or more content type features including at least one of a number of distinct content types, and a fraction of content types in each of a plurality of categories.

11. The method of claim 1 wherein the one or more registration related features comprise one or more of a registration age, a registration validity, an update age, an update validity and a registration email category.

12. The method of claim 1 wherein the one or more autonomous system related features comprise one or more of autonomous system numbers (ASNs) of resolved domain IP addresses, and a number of distinct ASNs.

13. The method of claim 1 wherein the one or more country related features comprise one or more of countries of resolved domain IP addresses, and number of distinct countries.

14. The method of claim 1 wherein the designated external features further comprise one or more hosting type features including one or more of a free-hosting indicator, a dynamic domain name service (DNS) indicator, and a shortener indicator.

15. The method of claim 1 wherein the regression method is trained on a training set that comprises a plurality of unclassified domains and a plurality of domains previously classified as malicious domains but that excludes a global whitelist of popular domains.

16. The method of claim 1 wherein the regression model comprises one of a random forest model, a logistic regression model and a decision trees regression model.

17. A computer program product comprising a non-transitory processor-readable storage medium having stored therein program code of one or more software programs, wherein the program code when executed by at least one processing device causes said at least one processing device:

to obtain internal log data of a computer network of an enterprise;

to extract values of a plurality of designated internal features from the log data;

to obtain additional data from one or more external data sources;

to extract values of a plurality of designated external features from the additional data;

to apply the extracted values to a regression model based on the internal and external features to generate malicious activity risk scores for respective ones of a plurality of domains;

to identify a subset of the domains based on their respective malicious activity risk scores; and to take one or more proactive security measures against the identified subset of domains;

wherein the malicious activity risk scores indicate likelihoods that the respective domains are associated with malware;

wherein the designated internal features comprise one or more communication related features, one or more domain structure related features, one or more uniform resource locator (URL) related features, and one or more user agent (UA) related features; and wherein the designated external features comprise one or more registration related features, one or more autonomous system related features, and one or more country related features.

18. An apparatus comprising:

at least one processing device comprising a processor coupled to a memory;

said at least one processing device being configured:

to obtain internal log data of a computer network of an enterprise;

to extract values of a plurality of designated internal features from the log data;

to obtain additional data from one or more external data sources;

to extract values of a plurality of designated external features from the additional data;

to apply the extracted values to a regression model based on the internal and external features to generate malicious activity risk scores for respective ones of a plurality of domains;

to identify a subset of the domains based on their respective malicious activity risk scores; and to take one or more proactive security measures against the identified subset of domains;

wherein the malicious activity risk scores indicate likelihoods that the respective domains are associated with malware;

wherein the designated internal features comprise one or more communication related features, one or more domain structure related features, one or more uniform resource locator (URL) related features, and one or more user agent (UA) related features; and wherein the designated external features comprise one or more registration related features, one or more autonomous system related features, and one or more country related features.

19. The apparatus of claim 18 wherein the designated internal features further comprise one or more referrer related features including at least one of a fraction of connections without a referrer, a number of distinct referrer domains, a ratio of distinct referrer domains and hosts, an average, maximum or minimum number of referrer domains per host, and a different referrer domain than itself indicator.

20. The apparatus of claim 18 wherein the apparatus is implemented in a network security system.

* * * * *